US00RE45710E

(19) United States
(12) Reissued Patent
Guimaraes

(10) Patent Number: US RE45,710 E
(45) Date of Reissued Patent: Oct. 6, 2015

(54) LOCKING PIN ASSEMBLY FOR AN EXCAVATOR WEAR MEMBER

(71) Applicant: CQMS Pty Ltd, Mackay (AU)

(72) Inventor: Miguel Guimaraes, Mackay (AU)

(73) Assignee: CQMS Pty Limited, Queensland (AU)

(21) Appl. No.: 29/463,598

(22) Filed: Nov. 22, 2013

Related U.S. Patent Documents

Reissue of:
(64) Patent No.: Des. 634,605
Issued: Mar. 22, 2011
Appl. No.: 29/362,308
Filed: May 24, 2010

(30) Foreign Application Priority Data

Dec. 11, 2009 (AU) ..... 14862/2009

(51) LOC (10) Cl. ..... 08-07
(52) U.S. Cl.
USPC ..... D8/343
(58) Field of Classification Search
USPC ..... D15/28; D8/343, 330, 331, 339; 403/220, 154, 156; 37/446, 455, 456, 37/459; 70/14, 51, 52, 57, 262, 431; 299/102; 172/713
See application file for complete search history.

(56) References Cited

U.S. PATENT DOCUMENTS

| | | | | |
|---|---|---|---|---|
| 3,526,435 | A * | 9/1970 | Krekeler | 299/109 |
| 5,074,062 | A * | 12/1991 | Hahn et al. | 37/456 |
| 5,617,655 | A * | 4/1997 | Launder et al. | 37/457 |
| 5,937,550 | A * | 8/1999 | Emrich | 37/458 |
| 5,992,063 | A * | 11/1999 | Mack | 37/450 |
| 6,439,796 | B1 * | 8/2002 | Ruvang et al. | 403/157 |
| 6,735,890 | B2 * | 5/2004 | Carpenter et al. | 37/456 |
| 6,757,995 | B2 * | 7/2004 | Pippins | 37/468 |
| 7,162,818 | B2 * | 1/2007 | Ruvang et al. | 37/456 |
| 7,313,877 | B2 * | 1/2008 | Clendenning et al. | 37/456 |
| D581,248 | S * | 11/2008 | Wu et al. | D8/343 |
| 7,603,799 | B2 * | 10/2009 | Campomanes | 37/456 |
| D614,476 | S * | 4/2010 | Buhse | D8/343 |
| 2002/0023375 | A1 * | 2/2002 | Pippins | 37/457 |
| 2006/0037219 | A1 * | 2/2006 | Robinson et al. | 37/456 |
| 2006/0236567 | A1 * | 10/2006 | Adamic | 37/452 |
| 2008/0209772 | A1 * | 9/2008 | Cui | 37/456 |
| 2009/0205228 | A1 * | 8/2009 | Ruvang | 37/456 |
| 2010/0162595 | A1 * | 7/2010 | Leslie et al. | 37/456 |
| 2010/0170119 | A1 * | 7/2010 | Lopez Almendros et al. | 37/452 |
| 2010/0229433 | A1 * | 9/2010 | Leslie et al. | 37/456 |

* cited by examiner

*Primary Examiner* — Phillip S Hyder
(74) *Attorney, Agent, or Firm* — Blank Rome LLP

(57) CLAIM

The ornamental design for a locking pin assembly for an excavator wear member, as shown and described.

DESCRIPTION

FIG. 1 is a top view of a locking pin assembly for an excavator wear member showing my new design;
FIG. 2 is a left side view thereof;
FIG. 3 is a front view thereof;
FIG. 4 is a right side view thereof;
FIG. 5 is a is a rear view thereof;
FIG. 6 is a bottom view thereof;
FIG. 7 is a front perspective view thereof;
FIG. 8 is an exploded left side view thereof;
FIG. 9 is an exploded front lower perspective view thereof; and,
FIG. 10 is an exploded front upper perspective view thereof.
*The broken lines depict portions of the pocket cutter in which the design is embodied that are not considered part of the claimed design.*

1 Claim, 3 Drawing Sheets

Figure 1:
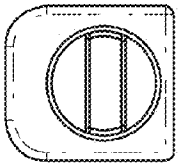
Figure 2:
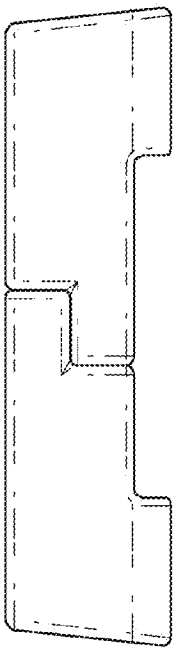
Figure 3:
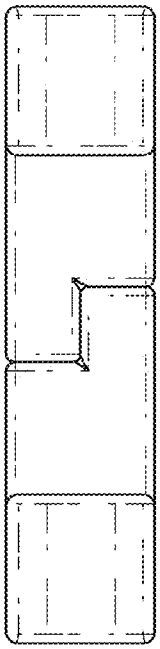
Figure 4:
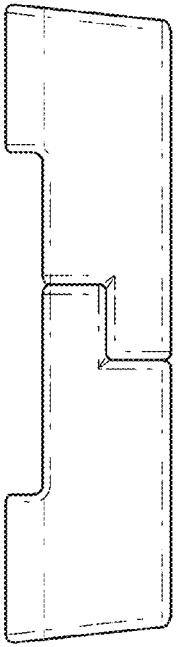
Figure 5:
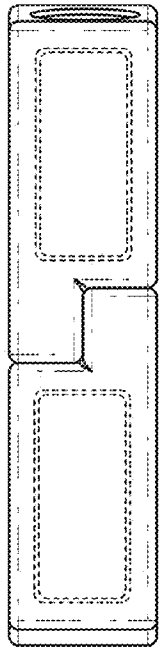
Figure 6:
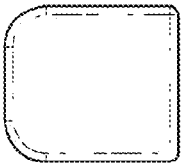
Figure 7:
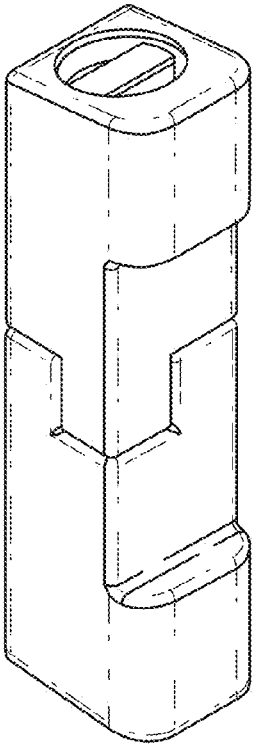
Figure 8:
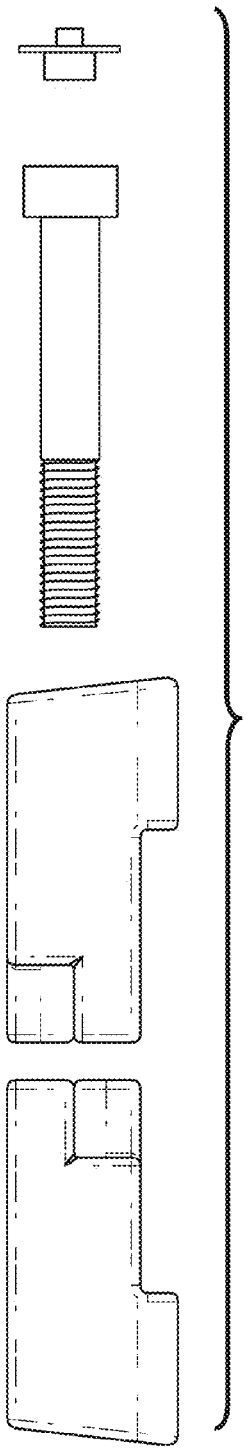
Figure 9:
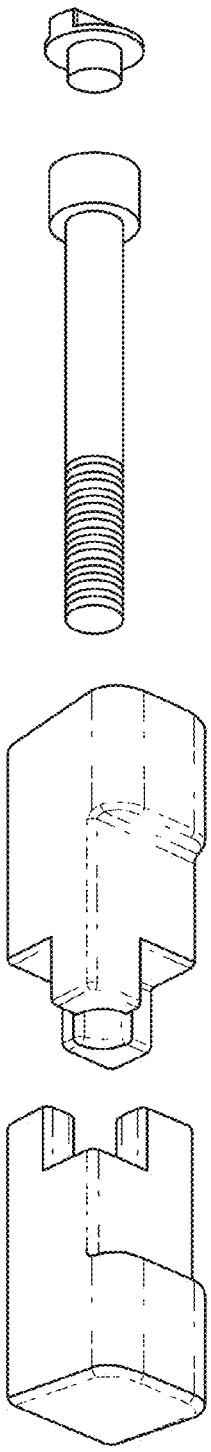
Figure 10:
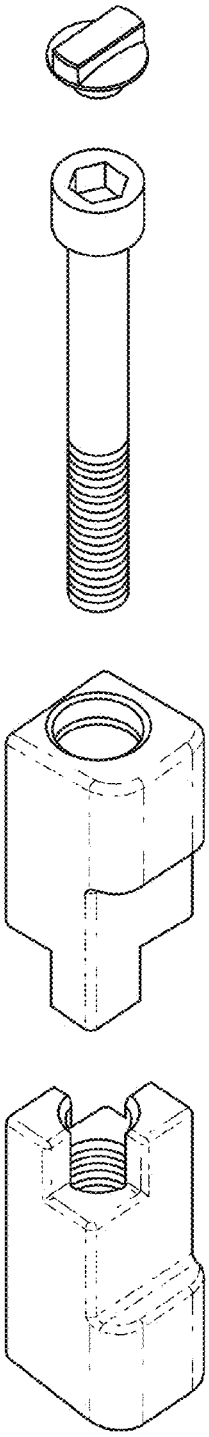

Matter enclosed in heavy brackets [ ] appears in the original patent but forms no part of this reissue; matter printed in italics indicates the additions made by reissue.